United States Patent
Saeed (10) Patent No.: US 11,060,505 B2
(45) Date of Patent: Jul. 13, 2021

(54) VERTICAL AXIS WIND TURBINE GENERATOR

(71) Applicant: Elemental Engineering AG, Baar (CH)

(72) Inventor: Osman Saeed, Stans (CH)

(73) Assignee: Elemental Engineering AG, Baar (CH)

( * ) Notice: Subject to any disclaimer, the term of this patent is extended or adjusted under 35 U.S.C. 154(b) by 0 days.

(21) Appl. No.: 16/494,096

(22) PCT Filed: Mar. 27, 2018

(86) PCT No.: PCT/EP2018/057842
§ 371 (c)(1),
(2) Date: Sep. 13, 2019

(87) PCT Pub. No.: WO2018/178120
PCT Pub. Date: Oct. 4, 2018

(65) Prior Publication Data
US 2020/0132047 A1 Apr. 30, 2020

(30) Foreign Application Priority Data

Mar. 27, 2017 (EP) .................................. 17163060

(51) Int. Cl.
*F03D 9/00* (2016.01)
*F03D 3/00* (2006.01)
(Continued)

(52) U.S. Cl.
CPC ............ *F03D 9/007* (2013.01); *F03D 3/005* (2013.01); *F03D 9/25* (2016.05); *H02S 10/12* (2014.12)

(58) Field of Classification Search
CPC . F03D 9/007; F03D 9/25; F03D 3/005; H02S 10/12
See application file for complete search history.

(56) References Cited

U.S. PATENT DOCUMENTS 7,008,171 B1 * 3/2006 Whitworth .............. H02S 10/12
415/4.2
2010/0172759 A1 * 7/2010 Sullivan .................... F03D 9/25
416/41
(Continued)

FOREIGN PATENT DOCUMENTS

DE 10 2011 012 910 A1 3/2012
EP 0049634 A1 4/1982
(Continued)

OTHER PUBLICATIONS

International Preliminary Report on Patentability and Written Opinion dated Oct. 1, 2019 from the International Bureau in application No. PCT/EP2018/057842.

(Continued)

*Primary Examiner* — Tulsidas C Patel
*Assistant Examiner* — Joseph Ortega
(74) *Attorney, Agent, or Firm* — Sughrue Mion, PLLC (57) ABSTRACT

A vertical axis wind turbine generator having a support stand (11), a shaft (41) defining the longitudinal direction and axis (19) of the generator. Two rotating members (12, 13) are coupled to the support stand (11) and the upper end of the shaft (41), thus being enabled to rotate about the axis (19). Two or more blades (14, 24, 34) having two free ends (15, 16) are connected by connecting members (17 and 18) to the two rotating members (12, 13), wherein movement of the first and/or second rotating members (12, 13) towards or away from one another causes the blades (14, 24, 34) to move further from, or closer to, the shaft (41).

21 Claims, 11 Drawing Sheets

(51) Int. Cl.
*F03D 9/25* (2016.01)
*H02S 10/12* (2014.01)

(56) References Cited

U.S. PATENT DOCUMENTS

| | | | | |
|---|---|---|---|---|
| 2010/0220466 | A1* | 9/2010 | Pelken | F03D 9/25 |
| | | | | 362/183 |
| 2010/0314876 | A1 | 12/2010 | Frayne | |
| 2012/0148403 | A1* | 6/2012 | Flaherty | F03D 13/10 |
| | | | | 416/1 |
| 2012/0243994 | A1* | 9/2012 | Saeed | F03D 3/062 |
| | | | | 416/88 |
| 2015/0118053 | A1* | 4/2015 | Burns | F03D 3/064 |
| | | | | 416/146 R |
| 2015/0337809 | A1* | 11/2015 | Jordan, Sr. | H02N 2/18 |
| | | | | 290/50 |
| 2017/0096985 | A1* | 4/2017 | Bardia | H02P 9/06 |

FOREIGN PATENT DOCUMENTS

| | | |
|---|---|---|
| WO | 2009/047595 A1 | 4/2009 |
| WO | 2011/042687 A2 | 4/2011 |
| WO | 2011/105970 A2 | 9/2011 |

OTHER PUBLICATIONS

International Search Report for PCT/EP2018/057842 dated Jul. 18, 2018 [PCT/ISA/210].
Written Opinion for PCT/EP2018/057842 dated Jul. 18, 2018 [PCT/ISA/237].

* cited by examiner

VERTICAL AXIS WIND TURBINE GENERATOR

CROSS REFERENCE TO RELATED APPLICATIONS

This Application Is A National Stage Of International Application No. Pct/Ep2018/057842 Filed Mar. 27, 2018, Claiming Priority Based On European Patent Application No. 17163060.1 Filed Mar. 27, 2017.

TECHNICAL FIELD

The present invention relates to a vertical axis wind turbine generator comprising a support stand, a shaft having a first end, a second end and an axis extending in a longitudinal direction of the generator; a first rotating member coupled to a portion at the first end of the shaft, a second rotating member coupled to the support stand, wherein the first and second rotating members are able to rotate about said axis; two or more blades having two free ends, wherein a first blade portion related to the first free end is connected to the first rotating member by a first connecting member and a second blade portion related to the second free end is connected to the second rotating member by a second connecting member, enabling the blades to rotate about said axis; and actuating means arranged to cause the first and/or second rotating members to move towards or away from one another along the axis, wherein this movement causes the blades to move further from, or closer to the shaft.

PRIOR ART

US 2010/172759 discloses a wind turbine electrical generating device where the blades that comprise the airfoil are retractable during operation. This feature is intended to provide damage protection and the ability to remain operational during high wind conditions. Further described is a computer feedback loop that controls the degree of retraction. In addition, lightweight airfoil turbine blades are described that are assembled from discrete segments.

US 2010/314876 discloses a wind turbine solar control system to be applied to various types of wind turbines that use a start-up motor or will be able to be turned efficiently using a sun powered motor. A rechargeable battery is used to hold enough power to start the propeller for a predetermined amount of time. Wind sensors will be included to determine if enough wind is present to turn the propeller on. A control box may be included to designate when to turn the motor on and off. It also controls how much to charge the battery and regulates when to stop charging.

WO 2009/047595 discloses a vertical-axis wind-powered system with photovoltaic cogeneration, for generating electric power, comprising a vertical-axis helical rotor and a system of fixed or moveable statoric shrouds that direct wind onto the rotor while increasing its speed of impact with the rotor in order to enhance the efficiency of the wind-powered generator and enable it to operate even when wind conditions are particularly unfavourable. Specifically, the means of photovoltaic cogeneration are positioned above the means of wind-powered generation.

WO 2011/042687 discloses a rotor system, particularly for use in a wind turbine generator system, wherein the turbine can be mounted vertically or horizontally. A support is provided having first and second rotating members coupled thereto, the rotating members being able to rotate about a common axis. One or more flexible blades having at least two ends are provided, one end being mounted on the first rotating member and another end being mounted on the second rotating member, so that they may rotate about the common axis. The first and second rotating members are arranged to rotate relative to each other, said rotation allowing the flexible blades to coil around an axis.

Actuating means are provided, being arranged to cause the ends of each blade to move closer together by movement of at least one of the rotating members along the common axis, specifically by causing the first and the second rotating members to rotate relative to each other, this relative rotation causing the flexible blades to coil around the common axis, thereby bringing the ends of each blade closer together.

DE 10 2011 012910 discloses a Darrieus H-rotor wind turbine having a scissors system for performance regulation in order to resolve the issue of protecting and decelerating the Darrieus H-rotor wind turbine at stormy wind conditions. The scissors system mounted between a rotor shaft and the rotor blades allows pulling and pushing the rotor blades from and to the rotor shaft, wherein a horizontal movement of the rotor blades is actuated by a vertical motion of a receiving disk on the rotor shaft. Specifically, the receiving disk can be vertically moved, for instance, over a motor-driven lifting-and lowering mechanism. Alternatively, a centrifugal force system may be fastened to the receiving disk configured to release a mechanism lowering the receiving disk by means of a tensioning spring in case of a predetermined rotational speed, whereby the rotor blade is centrally pulled to the rotor shaft.

Another wind powered turbine, in particular an H-type vertical axis turbine having variable geometry as a means of power control is shown in EP 0 049 634. It comprises a supporting member, a rotor member rotatable on the supporting member about a rotation axis, and a plurality of rotor blades carried by the rotor member at positions spaced around and equidistant from the rotation axis. Each blade has two portions capable of pivotal movement with respect to one another, and the turbine comprises reefing means capable of pivoting the blade portions in opposite directions so as to move them from a position parallel to the rotation axis to a position at which they form an angle about a plane perpendicular to the rotation axis, in order to reduce torque on the turbine.

SUMMARY OF THE INVENTION

Another major difficulty of a vertical axis or Darrieus turbine is to make it self-starting. Vertical axis turbine generators often do not start with soft breeze or gentle winds. Additionally, the blades are not always oriented in the optimum position, which may delay the energy generation. Finally, some prior art devices do not protect blades and additional elements of the system, as e.g. a solar panel, from high winds.

It is an objective of the present disclosure to provide an improved vertical axis turbine generator, in particular in terms of allowing a turbulence-free induced airflow when the turbine generator is in operation, which starts earlier to generate energy. In case the optimum position of the blades is not initially given, the device is self-sustaining by providing the necessary energy through the integrated solar panel which is not influenced by the function of the device. A battery is provided in the shaft of the device for storage of energy over night to be able to start and position the blades also in absence of natural light.

A vertical axis wind turbine generator comprising the features according to the preamble of claim 1 further comprises a solar panel mounted on the first end of the shaft (also denoted herein as center shaft) and a control unit connected to the solar panel and to the actuating means to provide the actuating means with power to move the first and/or second rotating members towards or away from one another and/or to provide the generator with power to start rotation of the blades.

During turbine operation, the solar panel will preferably be positioned in a horizontal orientation. The solar panel can be mounted on the shaft to rotate with the shaft. In another embodiment, the solar panel is mounted on a non-rotating part of the shaft. The shaft then has a rotating part and a support stand extending part. The main central shaft is not necessarily a one piece element. One alternative uses a fixedly horizontally oriented solar panel which interferes the least with impending winds. It is also possible to use a switch reluctance mechanism to maintain the static orientation of the solar panel while the turbine system is in operation. Magnetic fields thus allow to maintain a stable platform and reduce frictional field and turbulence.

The solar panel can be attached on the first end of the shaft with a joint, especially universal joint, providing a tilt and/or rotation capability for the solar panel. Said joint can comprise actuators to tilt and/or rotate the orientation of the solar panel.

The solar panel can comprise a solar position tracking device, sensing the orientation of the solar panel in view of the current position of the sun. This can be used when the shaft will not rotate, the turbine being e.g. in an almost closed configuration, and then the solar panel can be tilted under various conditions to gather the most solar energy through correct disposition of the main direction of the solar panel plane.

Preferably, the first and second connecting members are pivotably coupled to the rotating members and to the blades.

The connecting members preferably comprise straight portions (also denoted as straight profiles herein) and comprise each a curved portion oriented in a convex manner in opposition to the other. In the open position and configuration of the device, the straight portions of the connecting members are further preferably in contact with each other between the rotating members at the centre shaft and the beginning of the curved portion, stabilising the open position.

When the connecting members have inner straight profiles, then they can be positioned one on the other to provide a stable connection between the centre shaft and the vertically oriented blades. The lower surface of the upper connecting member then contacts the upper surface of the lower connecting member. These connecting members comprise each a curved portion oriented in a convex manner in opposition to the other so that, when the inner straight profiles are lying one on the other, a stronger tie is achieved between the different elements holding the blades in position.

The inner straight profiles can be complementary one to the other to join together, in the open position of the turbine generator, to form an aerodynamic profile. The curved portions of the connecting members can also have an aerodynamic profile on their own.

The vertical axis wind turbine generator can comprise only two blades. Then they will be mounted at an angular distance of 180° around the central shaft axis. For three blades, the angular distance between the three blades will be each time 120°. Of course it is also possible to provide 4, 5 or 6 blades with respective angular distances of 90°, 72° and 60°. Also, in the same way, higher numbers of blades are possible.

The straight profiles can be positioned, as seen in the open position of the turbine, at the upper free ends, at the lower free ends or at any distance in between. In a preferred embodiment, the straight profiles are positioned, in the open position of the turbine, at a distance of about two third from the upper free ends of the blades and at a distance of about one third from the lower free ends, so that ⅔ of the blades are clear of any obstructions in between to allow induced turbulence free airflow.

The blades are preferably attached at the connecting members at a fixed angle. Then, changing the effective radius of the blades when changing the state of deployment of the blades also alters the angle of attack of the vanes. This improves the overall solidity of the turbine system against different wind conditions, thereby altering the wind flow so as to be better harvestable, i.e. higher winds require less diameter than lower winds to generate the same torque required for the alternator of the system; thereby reducing overall demanded load on the gear arrangement.

The lower rotating member is preferably fixed in its vertical position at the support stand at a predetermined height, so that the lower free ends of the blades are at a predetermined minimum height above ground when the blades are fully extended and deployed. Such a minimum height can be 2.50 metre; to be sure that persons and small vehicles can pass below.

The diameter of the solar panel is preferably predetermined such that the inner surfaces of the blades are near the outer circumference of the solar panel or—in a top view— are even under the solar panel, or are touching it at its outer circumference, when the blades are in their fully retracted state. When the inner surfaces of the blades are touching the outer circumference of the solar panel construction in a closed configuration, then the solar panel as well as the blades are better protected against high winds. The upper free ends of the blades are further preferably positioned—in a view from above—against the outer edge of the disc shaped solar panel, when the turbine is closed, especially under pre-load or pretension, when the curved connecting portions are retracted. Then the free ends of the blades are in maintained contact with the centrally mounted solar panel while the middle portion of the blades is in connection with the central shaft via the curved portions of the connecting members, so that no element of the device is prone to vibration.

The connecting members preferably have inner straight profiles (or portions) connected to the rotating members and outer straight profiles (or portions) hingedly connected with the respective blades. In-between is a curved portion providing the connection and orientation of the blades. It is further preferred that a recess is provided at the inner surface of each blade to accommodate the outer straight profiles, preferably flush with the inner surface.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

The following describes in detail embodiments of the present disclosure. Examples of the embodiments are shown in the accompanying drawings, where reference signs that are the same or similar from beginning to end represent same or similar components or components that have same or similar functions.

Figure 1:
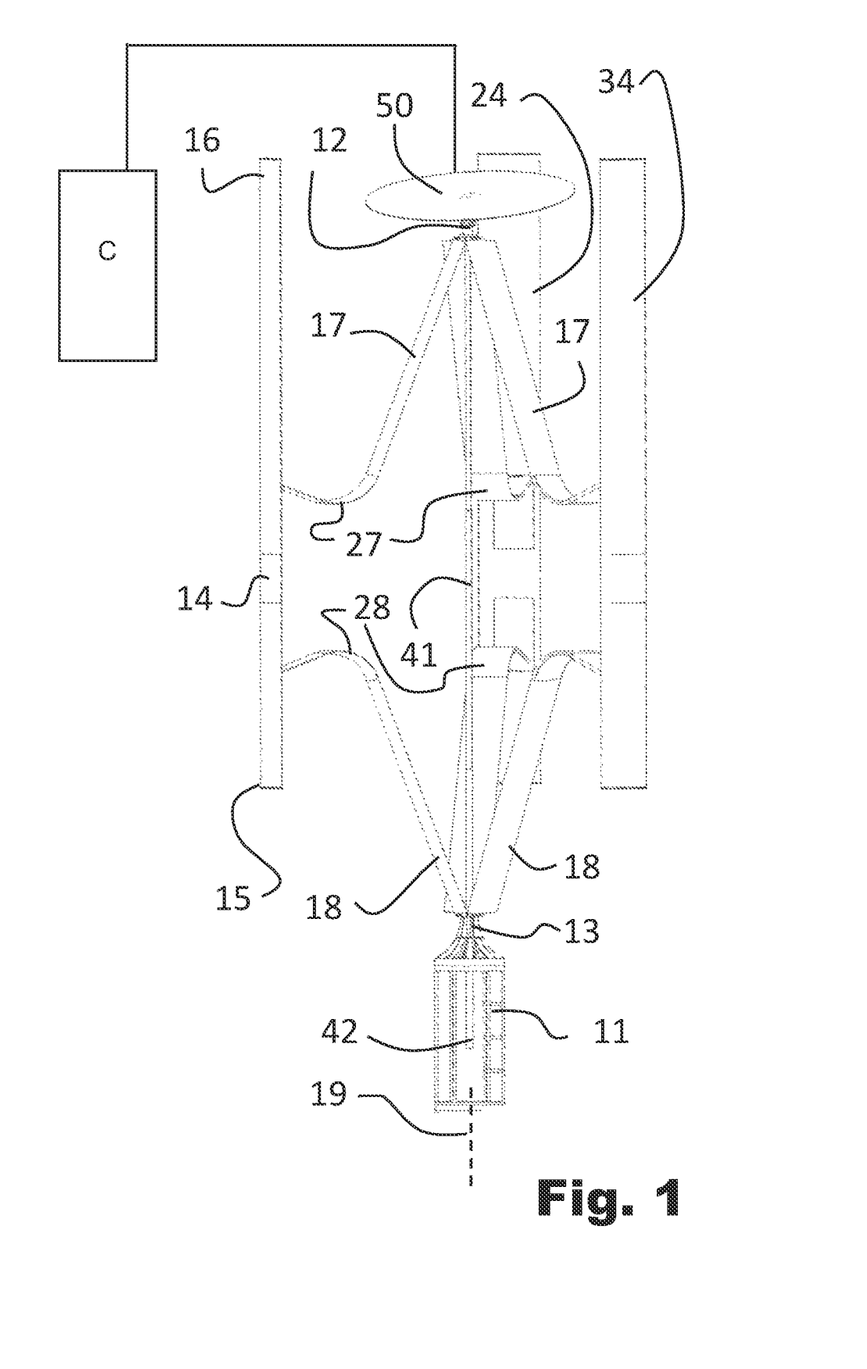
FIG. 1 shows a side view of a turbine according to an embodiment of the invention in a closed configuration.
Figure 2:
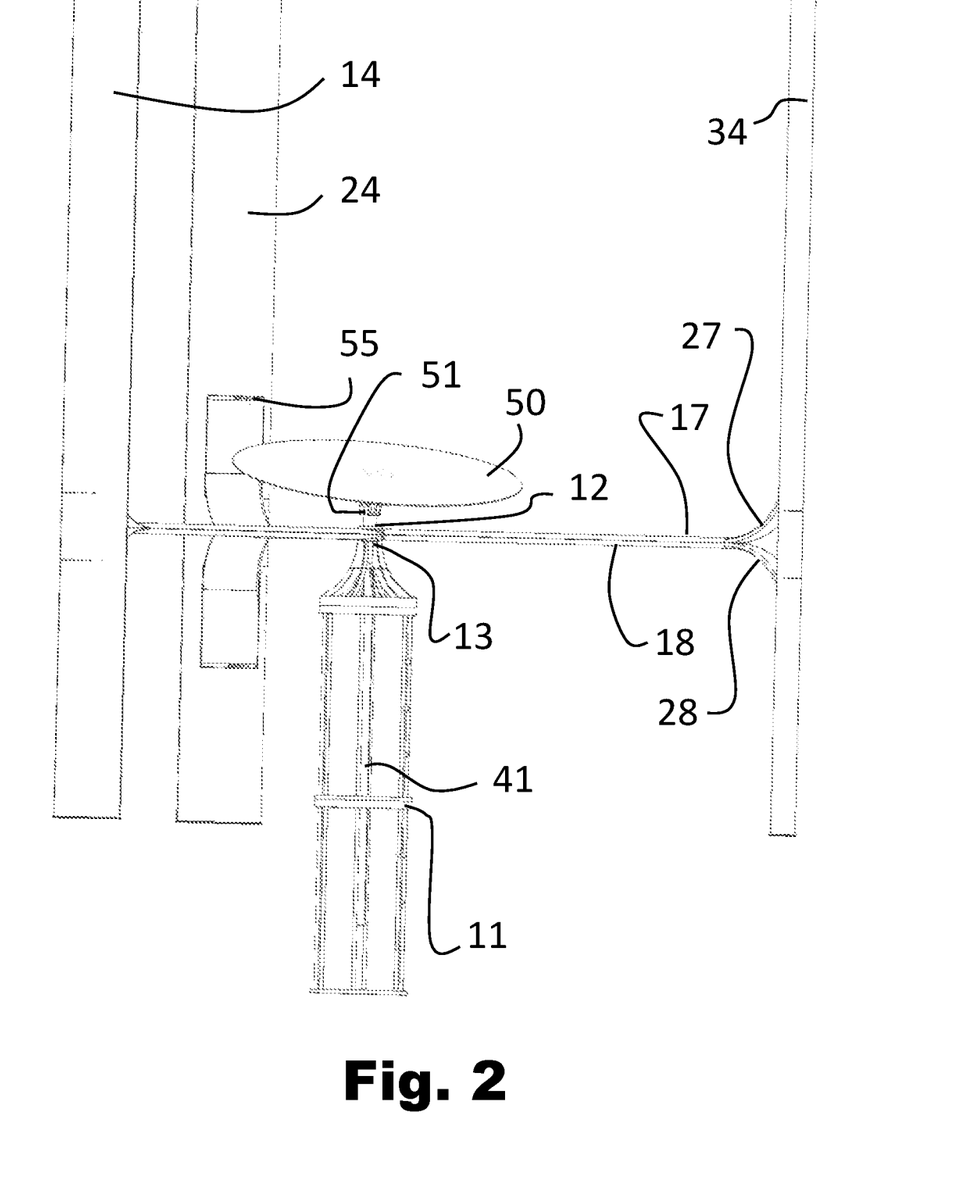
FIG. 2 shows a side view of a turbine according to FIG. 1 in an open configuration.

FIG. 1 shows a side view of a turbine according to an embodiment of the invention in a semi-closed configuration. FIG. 2 shows the same turbine in an open configuration. It is noted that the solar panel 50 is positioned horizontally (as better seen in FIGS. 5 and 8), the view of FIG. 2 is slightly from above to better distinguish the solar panel 50.

The vertical axis wind turbine generator comprises a support stand 11 positioned on a ground. It is essentially vertically oriented which is shown with longitudinal axis 19 of the generator. A telescopic shaft 41 (also denoted herein as center shaft) having a first end and a second end extends along said axis 19.

In one embodiment of mode of operation, the shaft 41 does rotate as will do the solar panel 50 mounted horizontally on the shaft 41. Then, there are two alternative embodiments with a rotating shaft 41. One alternative uses a fixedly horizontally oriented solar panel 50 which interferes the least with impending winds. Another alternative would use a switch reluctant mechanism using alternating fields to maintain a stable solar panel.

Figure 9:
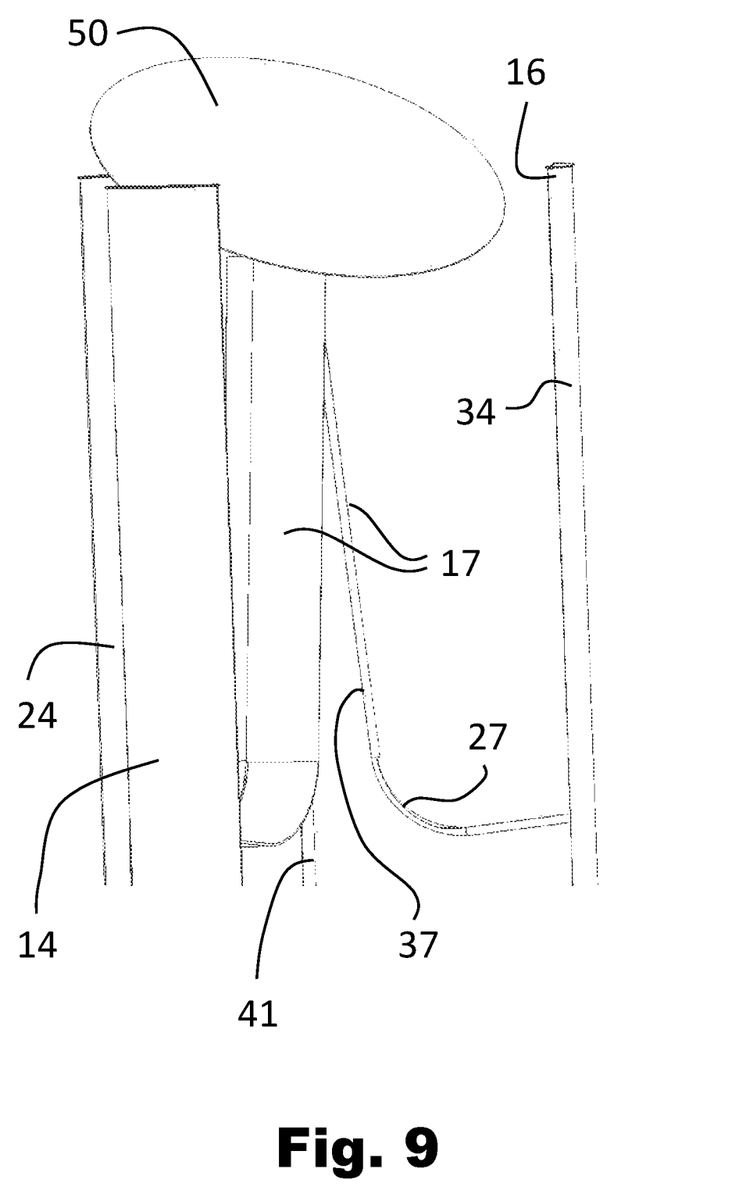
FIG. 9 shows a side view of a turbine according to an embodiment of the invention with a tilted solar panel and in an almost closed configuration.

In another embodiment of mode of operation, the shaft 41 will not rotate (e.g. the turbine stands still, being e.g. in an almost closed configuration, cf. FIG. 9) and then the solar panel 50 can be tilted under various conditions to gather the most solar energy through correct disposition of the main direction of the solar panel 50 plane.

Additionally, the shaft can provide for horizontal solar tracking when there is insufficient wind to generate power.

A first rotating member 12 is coupled to a portion at the first end of the shaft 41. A second rotating member 13 distant to the first rotating member 12 in the configuration of FIG. 1 is coupled to the support stand 11. These attachments allow the first and second rotating members 12, 13 to rotate about said axis 19.

Figure 5:
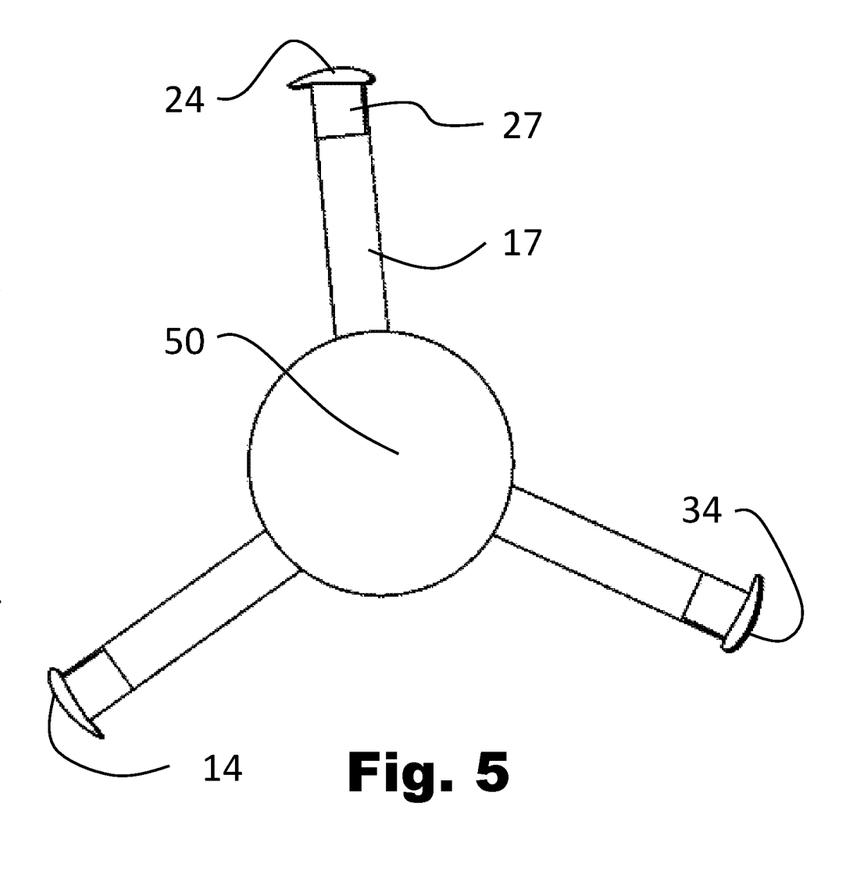
FIG. 5 shows a top view of the turbine according to FIG. 1 in a fully open configuration.
Figure 8:
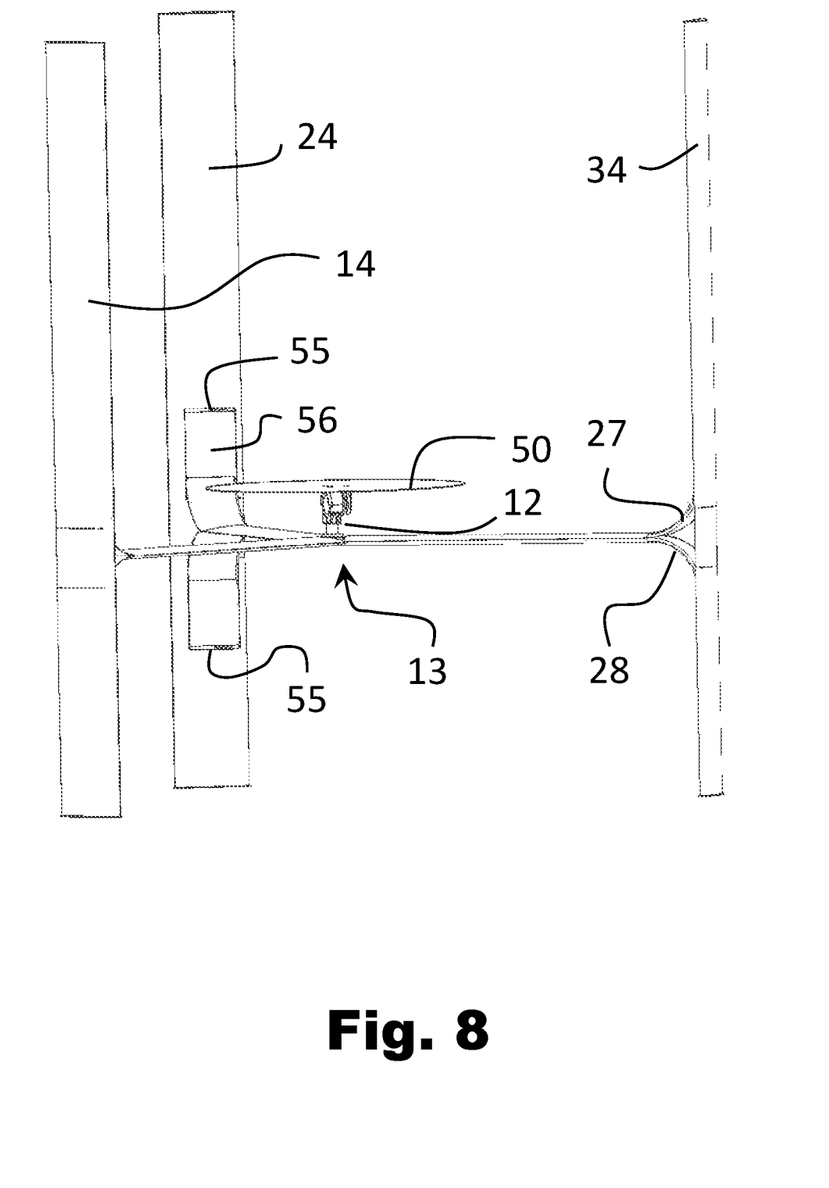
FIG. 8 shows a side view of the turbine according to FIG. 5 in its fully open configuration.

Three blades 14, 24 and 34, each having two free ends 15, 16 are provided for this generator. In a more general approach, the apparatus can comprise only two or more than 3 blades. Each of the blades 14, 24 and 34 has two integrated hinges on their inner side, directed radially to the shaft 41. The hinges connect exterior ends of the connecting members 17 and 18 at an upper and at a lower portion of each blade, wherein the inner ends of connecting members 17 and 18 are pivotably attached at the first and second rotating members, 12 and 13, respectively. Thus, the blades are enabled to rotate about said axis 19. The first connecting member 17 connects the first blade portion related to the first free end 16 with the first rotating member 12, and the second connecting member 18 connects a second blade portion related to the second free end 15 with the second rotating member 13. It is clear from the structure and kinematics of the generator that a movement of the first and/or second rotating members 12, 13 towards or away from one another causes the blades 14, 24, 34 to move further from, or closer to the shaft 41. Within this movement, the blades 14, 24 and 34 remain oriented perfectly vertically. FIG. 1 shows the semi-open position. FIGS. 2, 5, and 8 show the fully open position.

Actuating means (not shown in the drawings) are provided to cause the first and/or second rotating members 12, 13 to move towards or away from one another along the axis 19. The movement between FIG. 1 and FIG. 2 is realized through advancing the lower end 42 of shaft 41 into the support stand 11.

The central telescopic shaft 41 that is rotating in synchronization with rotating members 12 and 13 is connected to the alternator with a through-bore gear arrangement housed within the support stand 11.

A solar panel 50 is mounted on the first end of the shaft 41 and is connected to the control unit C, as shown in FIG. 1, of the generator to provide the generator with power to actuate the actuating means and/or to start a rotation of the blades. It is clear that, although not shown in the drawings, there are electric lines provided alongside or integrated in shaft 41, especially via vertical linear contacts and terminated before the alternator housed in the support stand 11 via slip ring that isolates power and signal.

The first and second connecting members 17, 18 of the embodiment of FIG. 1 are pivotably coupled to the rotating members 12, 13 and to the blades 14, 24, 34. The axis of pivot is in all cases horizontal and tangential to the circle of the rotation of all blades 14, 24, 34 for the outer fixation at the blades and close on a circle near the rotating members 12 and 13.

The connecting members 17 and 18 could be—in a simple embodiment—flat bands, but they are preferably NACA profiles, each representing half the cross section of the other, comprising each a curved portion 27 or 28 oriented in a convex manner opposing the other band and merging to form the indented profile of blades 14, 24 and 34, respectively. Each of the upper and lower arm members 17 and 18 (also denoted herein as first and second connecting members), respectively, has this curved portion 27 or 28 adjacent to the connection to the vane (or blade) 14, 24, 34 that sweeps in a curve from horizontal to vertical, ensuring a smooth, contiguous profile at least when in the fully deployed state. Thus, there is a smooth transition at the junction of the arm to the vane: from the full aerodynamic profile of the conjoined portion through to individual curved aerodynamic profiles for each of the upper and lower arm members at their outermost extents, and on to join the profile of the vane as seamlessly as possible, allowed for by the hinged coupling.

It is a principle of vertical axis wind turbines (VAWT) that, the wider the swept area is, the lower is the wind required; the narrower the swept area is, the greater is the required wind velocity. Also, there is a point of equilibrium of "perfect solidity" in which case the turbine is running at an optimum speed and airflow assumes that it is running over a solid.

Therefore, actuators (not shown) adjust the telescopic height of shaft 41 between the rotating members 12 and 13 for the point of solidity based on sensor input. FIG. 2 shows the most extended position of the blades 14, 24 and 34, where the connecting members 17 and 18 are lying one on the other for every pair of connecting members, whereas the curved portions 27 and 28 provide a stronger tie between the different elements for the positioning of the blades which are always positioned vertically. In a fully deployed configuration, the telescopic shaft 41 is fully retracted within the support stand 11 and the upper connecting member 17 is brought down and brought together with the lower connecting member 18. In this position, the upper and lower connecting members 17, 18 of each of the pairs of deployable arms join together to form an aerodynamic profile. The aerodynamic profile brings aerodynamic efficiencies to the turbine and can be selected to be tuned to the intended operating speed of the turbine. In this state, the top two thirds of the vanes/blades are clear of any obstructions; there are no objects inside the swept area in that region and hence the airflow is free from induced turbulence. The diameter of an embodiment of the device with extended blades is e.g. 4.5 meters.

More generally, the inner straight profiles of connecting members 17 and 18, in the open position, can be positioned between the upper (i.e. first) free ends 16 and the lower (i.e. second) free ends 15 at a distance of between 80 to 60% of the entire length of the blades 14, 24 and 34 from the upper free ends 16 and be positioned between the lower free ends 15 and the upper free ends 16 at a distance of about 20 to 40% of the entire length of the blades 14, 24 and 43 from the lower free ends 15, so that more than half of the length of the blades 14, 24 and 34 are clear of any obstructions in between to allow induced turbulence-free airflow. In other words, the free ends of the blades 14, 24 and 34 are rising in the open position of the turbine above the construction allowing for better airflow while being lower and nearer to the center elements like the solar panel 50 in the retracted, or closed, position.

Figure 3:
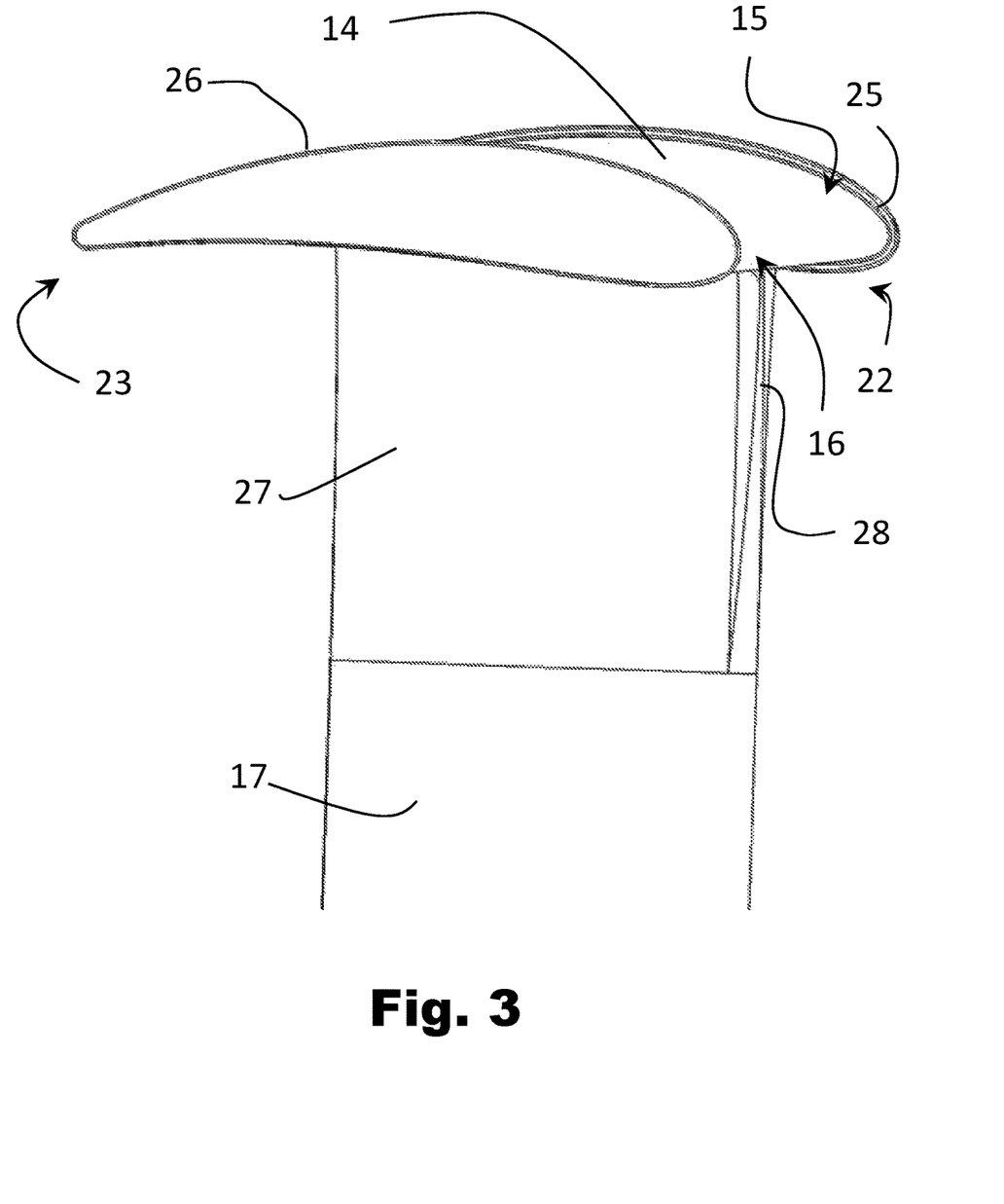
FIG. 3 shows a top view of the blade profile as used in connection with the embodiment of FIG. 1.

FIG. 3 shows a top view of the blade profile as used in connection with the embodiment of FIG. 1. The profile is shown slightly from an angle showing the entire length of the blade from the upper free end 16 to the lower free end 15. The profile shown in FIG. 3 is the so-called "NACA 14" profile, curved along the mean line to follow the radius of the turbine rotational axis, which profile has produced best results at the full swept diameter configuration on current testing. Reference numerals are used in connection with blade 14. At both free ends 15 and 16, there is provided an edge 25 and 26, respectively. The curved attachment portions 27 and 28 are shown being hingedly coupled with the blade 14. FIG. 3 shows the blade 14 in a state where the telescopic shaft 41 is retracted, the connecting arms 17 and 18 are hinged towards one another, extending the three blades outwards in a position where the arms 17, 18 overlay one another to form a set of aero-profiled spokes extending horizontally to the vertical blades which are at full radial extension for maximum swept area as shown in FIG. 2. The leading edge 22, essentially vertically oriented, is attacking the wind, while the trailing edge 23 at the opposite end marks the end of the blade, formed to avoid turbulences behind the blades 14, 24 and 34.

Figure 4:
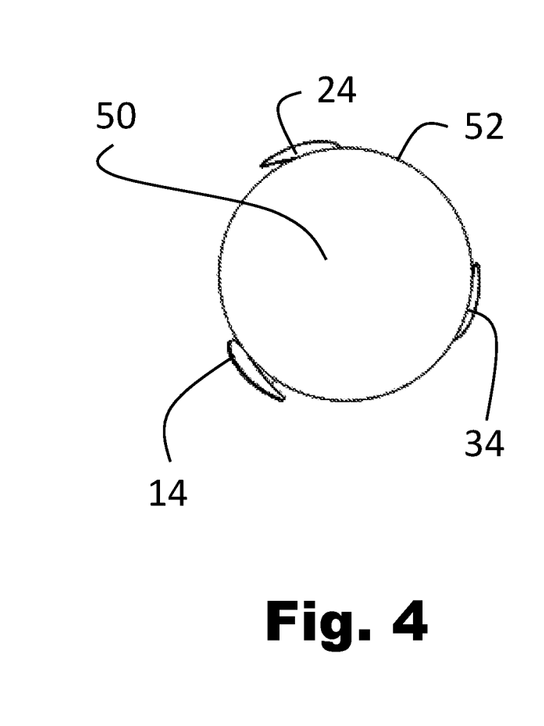
FIG. 4 shows a top view of the turbine according to FIG. 1 in a closed configuration.

One important concept and advantage of the turbine according to embodiments of the invention can be seen from FIG. 4 and FIG. 5, when seen one beside the other on a similar scale. FIG. 4 shows a top view of the turbine according to FIG. 1 in a closed configuration and FIG. 5 shows a top view of the same turbine according to FIG. 1 in a fully open configuration. The disc-shaped solar panel 50 is the same in both drawings and has thus the same surface. The free ends 16 of the three blades 14, 24 and 34 are positioned—in the view from above—very near to the outer edge 52 of the disc-shaped solar panel 50, when the turbine is closed. Depending on the layout of the first and second connecting members, the solar panel 50 can even have a disc size covering the free upper ends 16 partially or totally, since the solar panel 50 can be mounted above the upper free ends 16 in the closed configuration of the turbine. In the open configuration of FIG. 5, the connecting members 17 and 18 are essentially positioned one on the other, the blades 14, 24 and 34 are then in a far greater distance from the center shaft 41.

The comparison between FIG. 4 and FIG. 5 explains a further advantage of the invention. Each blade 14, 24 or 34 has an attack angle. This angle can be defined by any angle the front portion, middle portion or end portion of the blade 14, 24 or 34 may have towards the radial connection line towards the center of shaft 41. If, in the closed configuration of FIG. 4, the distance between the middle portion of a blade 14 and the center of shaft 41 is $r_{closed}$, then the distance of the leading edge to the center is $r_{closed}$ minus a first distance and the distance of the trailing edge to the center is $r_{closed}$ plus a first distance. In the open configuration of FIG. 5, an extension distance d is added to all values at stake, so that the leading edge has now a distance of $r_{closed}$ plus d minus the first distance while the trailing edge now has a distance of $r_{closed}$ plus d plus the first distance. Although the relevant distance from the center is now also higher, $r_{closed}$ plus d, the impact of the value of the first distance on the said attack angle is smaller and thus the attack angle itself is smaller when the blades 14, 24, 34 are in an open configuration.

Figure 6:
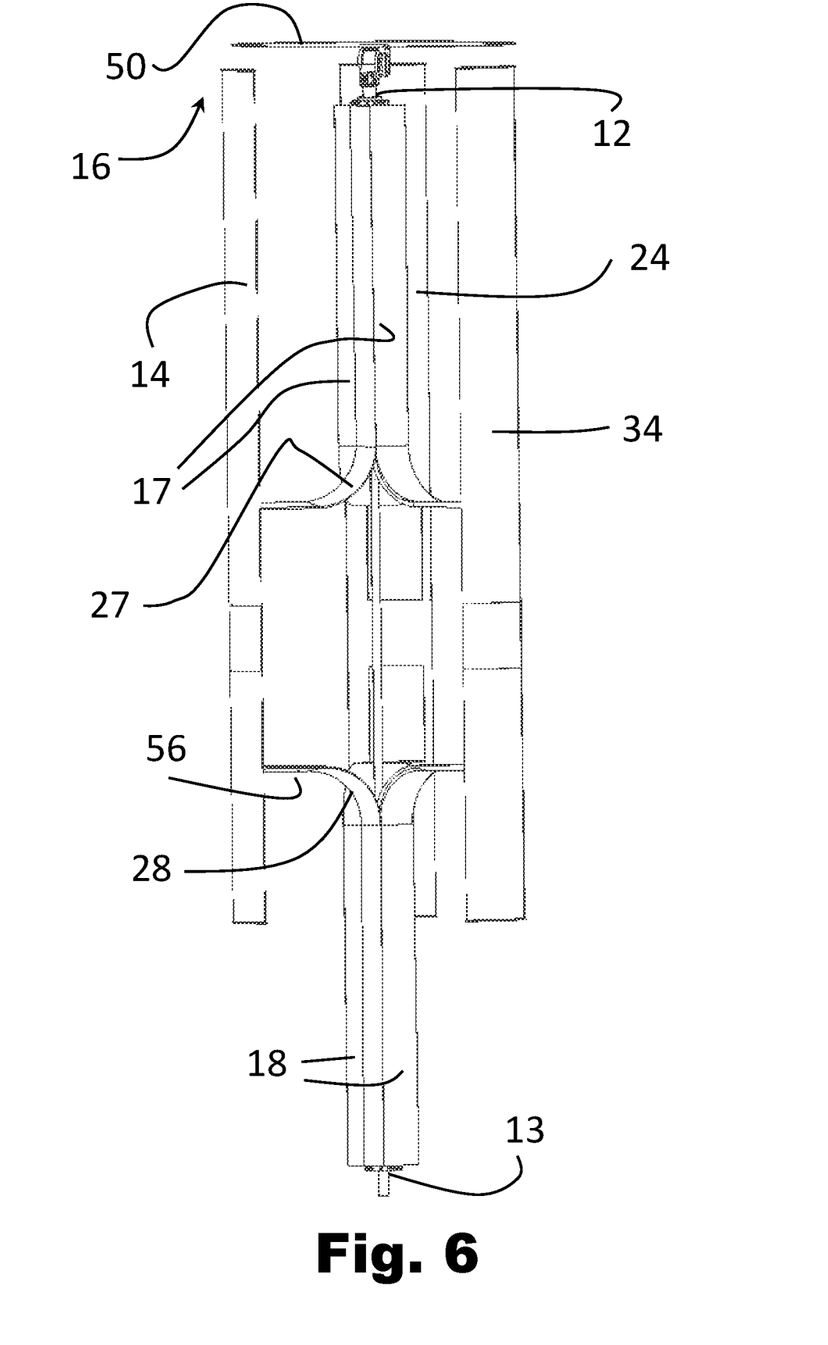
FIG. 6 shows a side view of the turbine according to FIG. 4 in its closed configuration.

FIG. 6 shows a side view of the turbine according to FIG. 4 in its closed configuration. It can be seen that the upper free ends 16 of the blades 14, 24, and 34 are positioned below the solar panel 50, but they are extending above the hinge at the first rotation member 12. The three upper connecting members 17 are positioned vertically one beside the other and the curved portion 27 forms a 90 degree turn to essentially horizontally engage the hinge on the inner side of every blade 14, 24 and 34. The same is true for the lower connecting member 18 attached to the second rotating member.

Figure 7:
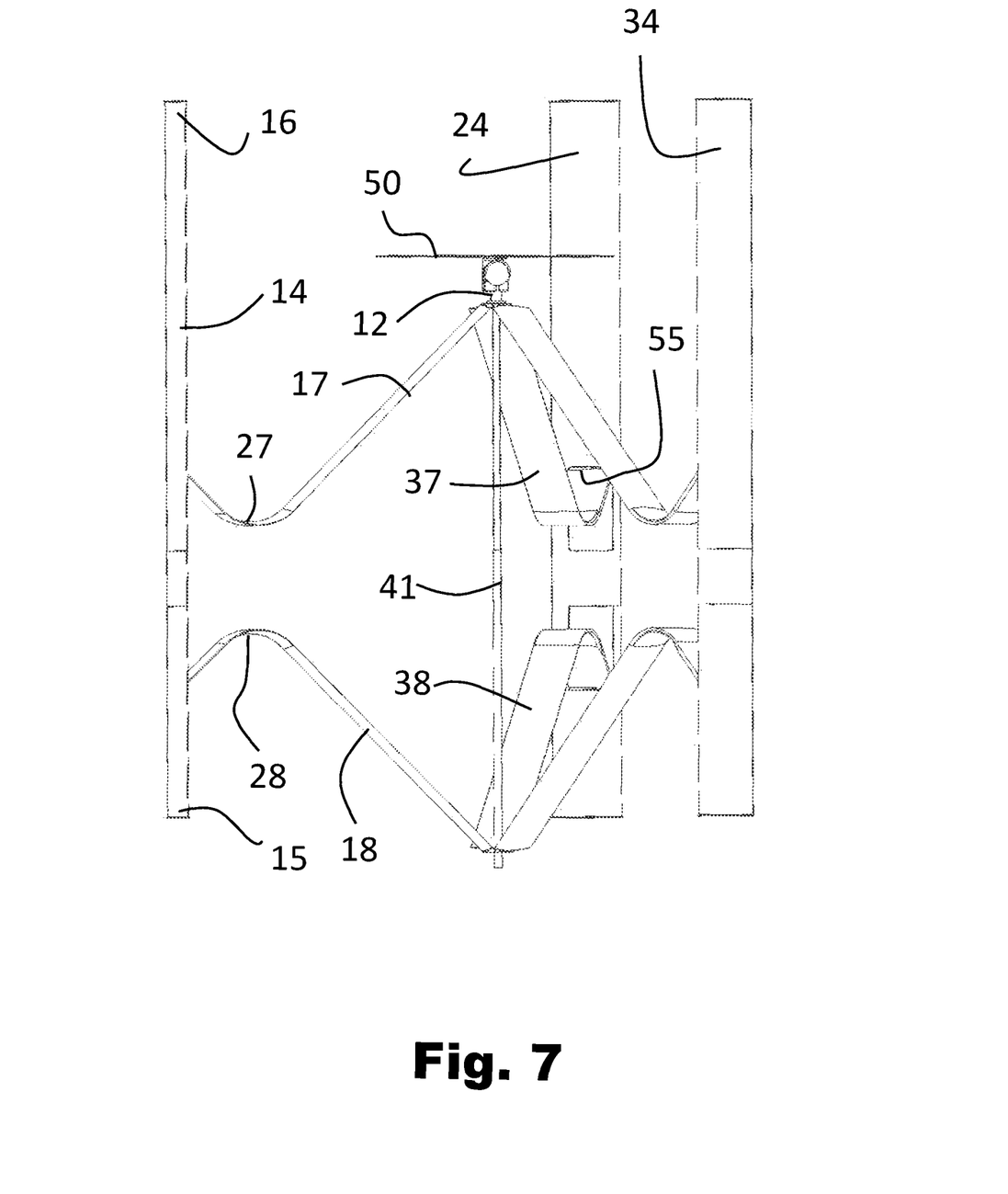
FIG. 7 shows a side view of the turbine according to FIG. 1 in a half-open configuration.

FIG. 7 shows a side view of the turbine according to FIG. 1 or 6 in a half-open configuration. Here, the two connecting members 17 and 18 are no longer vertically oriented around shaft 41 but have a nearly 45 degree orientation one directed towards the other, wherein the curved portions 27 and 28 start to fold together. It can be seen from FIG. 7, especially in comparison with FIG. 6, that the upper free ends 16 are now oriented higher than the plane provided by the solar panel 50. In another embodiment not shown in the drawings, the upper rotating member 12 is lowered to open up the turbine and the upper free ends 16 remain positioned lower than the horizontal solar panel.

FIG. 8 shows a side view of the turbine according to FIG. 5 in its fully open configuration (without shaft 41, and with position of lower rotating member 13 being indicated). Since the upper rotating member 12 maintained its vertical distance to the solar panel 50, the main parts of the blades 14, 24 and 34 are now above the solar panel 50. Upper connecting member 17 and lower connecting member 18 are positioned one on the other. The complementary form of the lower surface 37 of the upper connecting member 17 and the upper surface 38 of the lower connecting member 18 provide an aerodynamically formed horizontally oriented vane on its radial length between the portion hingedly connected to the rotating members 12 and 13, respectively, and the diverging curved portions 27 and 28, maintaining the blades 14, 24, 34 vertically oriented.

FIG. 9 shows a side view of a turbine according to an embodiment of an operational mode with a tilted solar panel 50 and in an almost closed configuration. The lower surface 37 of the upper connecting member 17 has just left the central shaft 41 and the free ends 16 of the blades 14, 24 and 34 rise. The solar panel 50 is slightly tilted. Preferably, the inner shaft 41 does not rotate and the solar panel is directed to the current direction of the sun.

Figure 10:
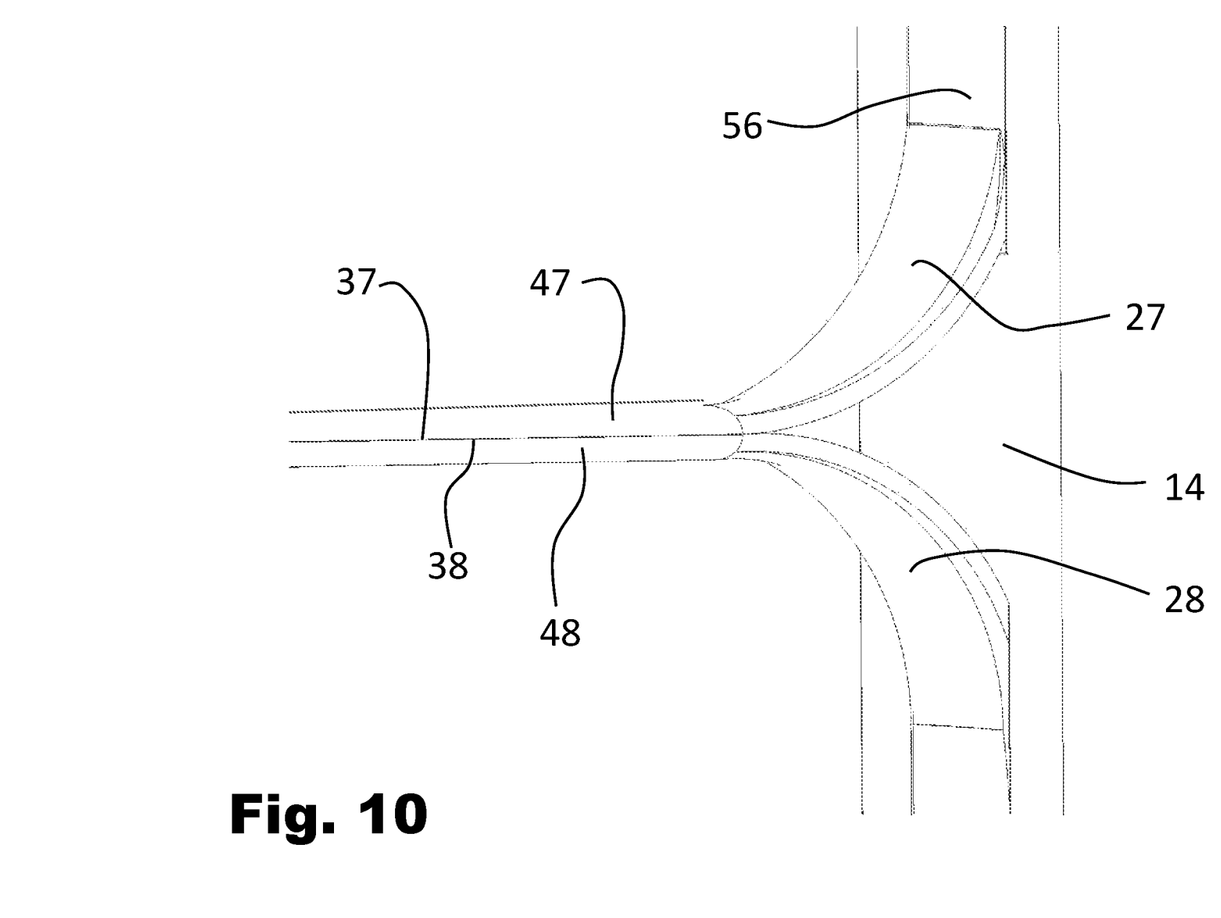
FIG. 10 shows a detail view of the connecting members with their curved portion for an embodiment of FIG. 1 or FIG. 9 in a fully open configuration.

FIG. 10 shows a detail view of the connecting members 17, 18 with their curved portion 27 and 28 for an embodiment of FIG. 1 or FIG. 9 in a fully open configuration. The upper surface 47 of the upper connecting member 17 and the lower surface 48 of the lower connecting member 18 together form the aerodynamic vane stabilising the just contacting lower and upper surfaces 37 and 38, respectively. Lower and upper surfaces 37 and 38 can be flat or they can be curved to have a form fit similar connection between the connecting members 17 and 18. On the other side, the upper and lower surfaces 47 and 48 are preferably curved and are touching one another on both side edges of the connecting members 17 and 18.

The curved portions 27 and 28 provide for each blade, here blade 14, a perfect 90 degree web stabilising the vertical position, supported by the fit of the connecting members 17 and 18.

Figure 11:
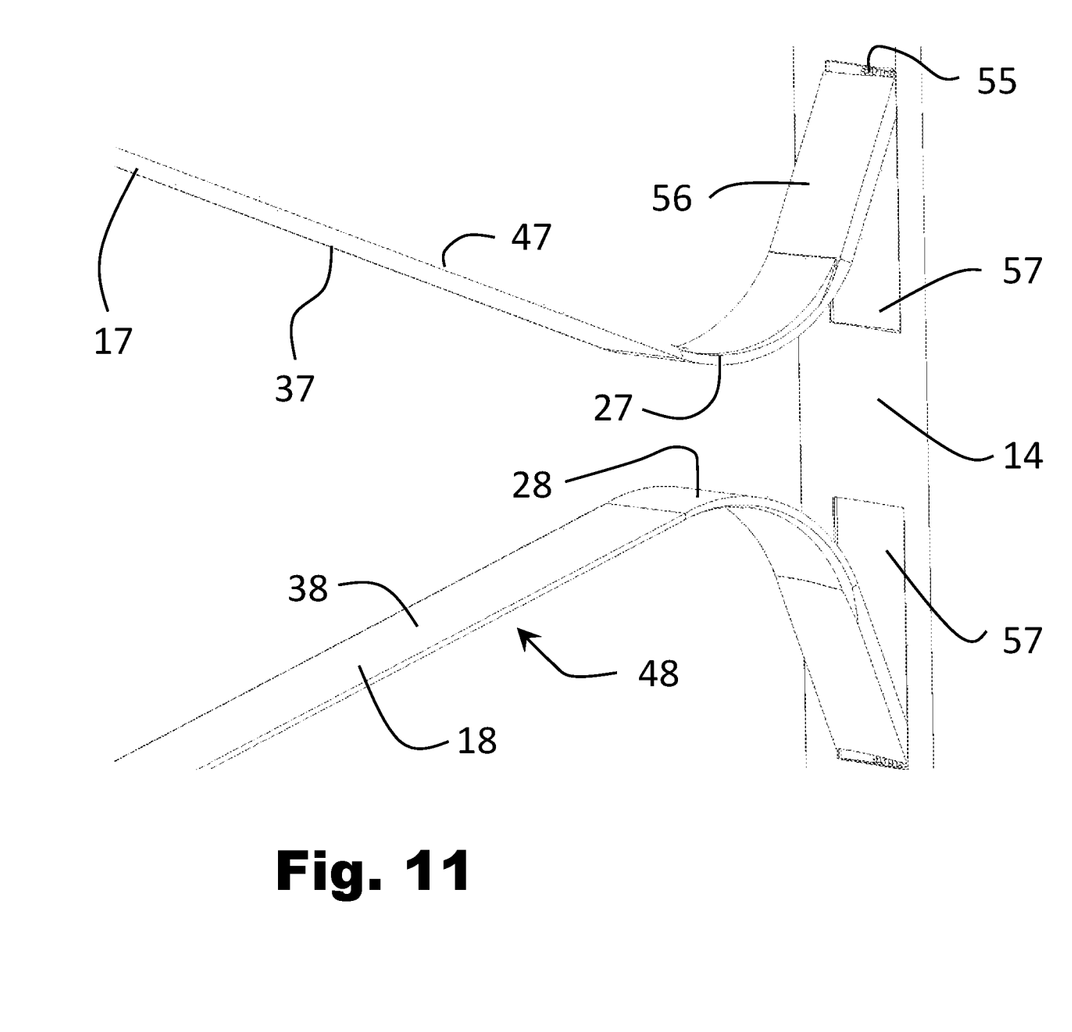
FIG. 11 shows a detail view of the connecting members with their curved portion and attachment to the blades for an embodiment of FIG. 1 or FIG. 9 in a half open configuration.

FIG. 11 on the next drawing page shows a detail view of the connecting members 17 and 18 with their curved portions 27 and 28 and attachment to the blades 14, 24, 34 for an embodiment of FIG. 1 or FIG. 9 in a half open configuration. The curved portion 27 is connected via an outer straight portion (or profile) 56 to a hinge 55 at blade 14. Hinge 55 can be provided in the inner surface of blade 14 in the sense that the inner surface of blade 14 comprises a recess provided to accommodate the outer straight portion 56 and a transfer portion of the curved portion 27. This can be better seen by returning to FIG. 10, where the outer straight portion 56 is sunk-in flush with the inner surface of the blade 14.

Figure 12:
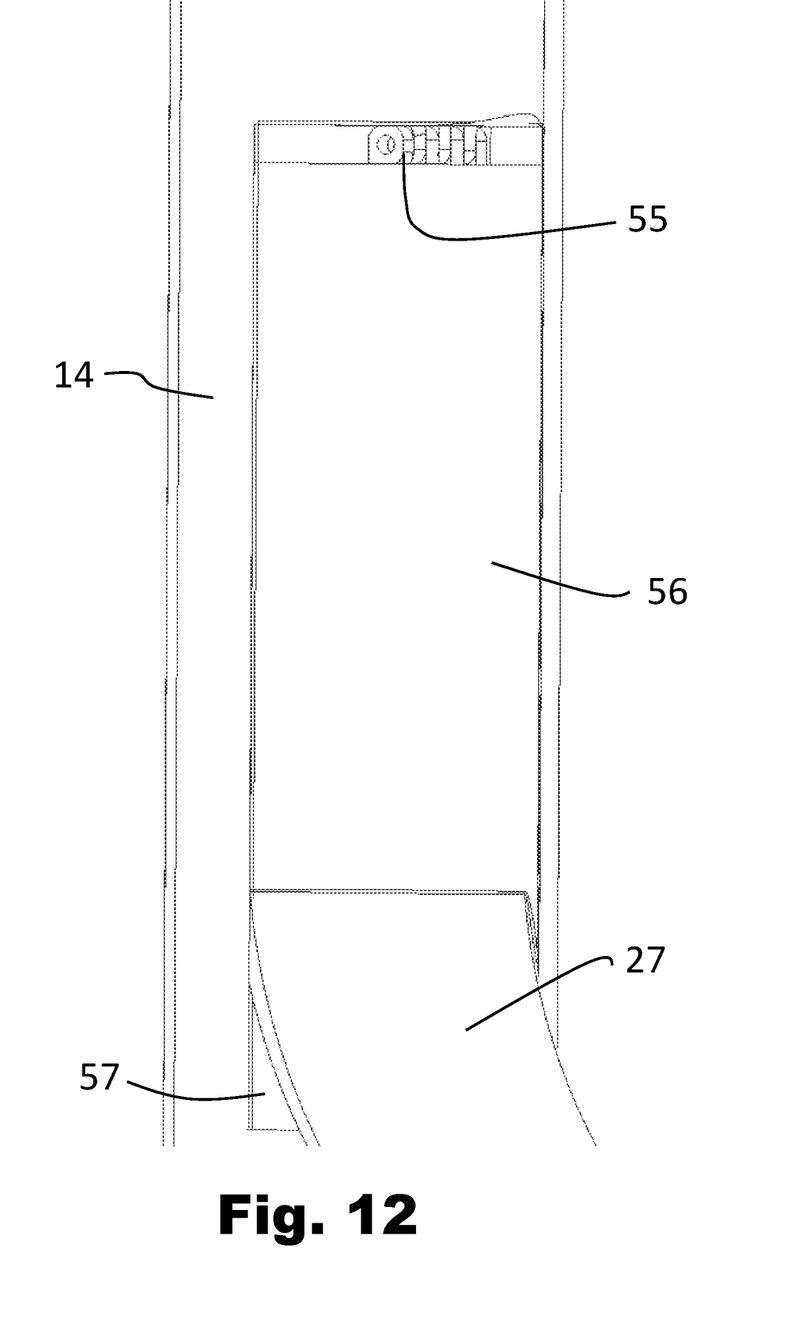
FIG. 12 shows a detail view of the curved portion of a connecting member and its attachment to the blades for an embodiment of FIG. 1 or FIG. 9.

Finally, FIG. 12 shows a detail view of the curved portion 27 of a connecting member and its attachment to the blades 14, 24, 34 for an embodiment of FIG. 1 or FIG. 9. Recess 57 ends on one side with hinge 55 wherein, on its other side, recess 57 allows the curved portion 27 to continuously contact the outer straight portion 56 accommodated inside the blade 14.

LIST OF REFERENCE SIGNS 11 support stand
12 first rotating member
13 second rotating member
14 blade/vane
15 second/lower free end
16 first/upper free end
17 first connecting member/arm
18 second connecting member/arm
19 longitudinal axis
22 leading edge
23 trailing edge
24 blade/vane
25 edge
26 edge
27 curved portion
28 curved portion
34 blade/vane
37 lower surface
38 upper surface
41 (centre) shaft
42 lower end of shaft
47 upper surface
48 lower surface
50 solar panel
51 orientation actuators
52 outer edge
55 hinge
56 outer straight portion/profile
57 recess in blade

The invention claimed is:

1. A vertical axis wind turbine generator comprising:
a support stand;
a shaft having a first end, a second end and a vertical axis extending in a longitudinal direction of the wind turbine generator;
a first rotating member coupled to a portion at the first end of the shaft;
a second rotating member coupled to the support stand, wherein the first and second rotating members are configured to rotate about the vertical axis;
two or more blades having two free ends defining two opposite blade portions;
a first connecting member connecting the first blade portion related to the first free end with the first rotating member;
a second connecting member connecting a second blade portion related to the second free end with the second rotating member, and
wherein at least one of the first or second rotating members is configured to move towards and away from the other of the first or second rotating member along the vertical axis, thereby causing the blades to move, respectively, further from and closer to the shaft;
wherein the shaft is connected through the support stand to an electric generator; and
the vertical axis wind turbine generator further comprising a solar panel and a control unit connected to the solar panel that supplies power for movement of the at least one of the first or second rotating members towards and away from the other of the first or second rotating member along the vertical axis.

2. The vertical axis wind turbine generator according to claim 1, wherein the solar panel (50) is attached on the first end of the shaft (41) by a joint providing a tilt and/or rotation capability for the solar panel.

3. The vertical axis wind turbine generator according to claim 2, wherein the solar panel (50) comprises a solar position tracking device, sensing the orientation of the solar panel in view of the current position of the sun.

4. The vertical axis wind turbine generator according to claim 2, wherein said joint comprises actuators to tilt and/or rotate an orientation of the solar panel (50).

5. The vertical axis wind turbine generator according to claim 1, wherein the solar panel (50) is mounted on the shaft (41) to rotate with the shaft (41), or wherein the solar panel (50) is mounted on a non-rotating part of the shaft (41).

6. The vertical axis wind turbine generator according to claim 1, wherein the first and second connecting members (17, 18) are pivotably coupled to the rotating members (12, 13) and to the blades (14, 24, 34).

7. The vertical axis wind turbine generator according to claim 1, wherein the first and second connecting members (17, 18) comprise each an essentially straight inner profile connected to the respective first and second rotating member (12, 13), an essentially straight outer profile (56) hingedly connected to the respective blade (14, 24, 34), and in between a respective intermediate curved portion (27, 28) oriented in a convex manner in opposition to the respective other one.

8. The vertical axis wind turbine generator according to claim 7, wherein, in the open position, the inner straight profiles of the first and second connecting members (17, 18) are in contact with each other (37, 38) between the first and second rotating members (12, 13) at the centre shaft (41) and the beginning of the curved portion (27, 28), thus stabilising the open position.

9. The vertical axis wind turbine generator according to claim 7, wherein the inner straight profiles of the first and second connecting members (17, 18) are complementary to join together, in the open position of the turbine generator, wherein the outer surfaces (47, 48) form an aerodynamic profile.

10. The vertical axis wind turbine generator according to claim 7, wherein the curved portions (27, 28) have an aerodynamic profile.

11. The vertical axis wind turbine generator according to claim 7, wherein the inner straight profiles of the first and second connecting members (17, 18), in the open position, are positioned between the upper free ends (16) and the lower free ends (15) at a distance of between 80 and 60% of the entire length of the blades (14, 24, 34) from the upper free ends (16) and are positioned between the lower free ends (15) and the upper free ends (16) at a distance of about 20 to 40% of the entire length of the blades (14, 24, 34) from the lower free ends (15), so that more than half of the length of the blades (14, 24, 34) are clear of any obstructions in between to allow induced turbulence free airflow.

12. The vertical axis wind turbine generator according to claim 11, wherein the inner straight profiles of the connecting members (17, 18), in the open position, are positioned between the upper free ends (16) and the lower free ends (15) at a distance of 66.6% of the entire length of the blades (14, 24, 34) from the upper free ends (16) and are positioned between the lower free ends (15) and the upper free ends (16) at a distance of about 33.3% of the entire length of the blades (14, 24, 34) from the lower free ends (15), so that ⅔ of the length of the blades (14, 24, 34) are clear of any obstructions in between to allow induced turbulence free airflow.

13. The vertical axis wind turbine generator according to claim 7, wherein the outer straight profiles (56) of the connecting members (17, 18) are hingedly (55) connected with the respective blades (14, 24, 34), wherein a recess (57) is provided at the inner surface of each blade (14, 24, 34) to accommodate the outer straight profiles (56) in the inner surface.

14. The vertical axis wind turbine generator according to claim 13, wherein the recess (57) provided at the inner surface of each blade (14, 24, 34) is adapted to accommodate the outer straight profiles (56) flush with the inner surface.

15. The vertical axis wind turbine generator according to claim 1, wherein the blades (14, 24, 34) are attached at the connecting members (17, 18) at a fixed angle, such that changing the effective radius of the rotating blades (14, 24, 34) also alters the angle of attack of the vanes.

16. The vertical axis wind turbine generator according to claim 1, wherein the lower second rotating member (13) is fixed in its vertical position at the support stand (11) at a predetermined height, so that the lower second free ends (15) of the blades are at a predetermined minimum height above ground when the blades (14, 24, 34) are fully extended and deployed.

17. The vertical axis wind turbine generator according to claim 1, wherein the diameter of the solar panel (50) is predetermined such that the inner surface of the blades (14, 24, 34) are near or—in a top view—inside the outer circumference of the solar panel (50) or are touching solar panel, when the blades are in their fully retracted state.

18. The vertical axis wind turbine generator according to claim 17, wherein the free upper ends (16) of the blades (14, 24, 34) are positioned against the outer edge of the disc shaped solar panel (50) under pre-load, when the first and second connecting members (17, 18) are retracted, when the turbine is closed.

19. The vertical axis wind turbine generator according to claim 1, wherein the control unit is connected to the electric generator to provide the electric generator with power to start rotation of the blades.

20. The vertical axis wind turbine generator according to claim 1, wherein the at least one of the first or second rotating members is configured to move towards and away from the other of the first or second rotating member along the vertical axis through advancing the shaft into the support stand.

21. The vertical axis wind turbine generator according to claim 1, wherein the first and second connecting members are hingedly coupled, to the rotating members and to the blades.

* * * * *